United States Patent
Osako

(10) Patent No.: US 9,037,759 B2
(45) Date of Patent: May 19, 2015

(54) STORAGE MEDIUM, INFORMATION PROCESSING APPARATUS, INFORMATION PROCESSING METHOD AND INFORMATION PROCESSING SYSTEM

(75) Inventor: Satoru Osako, Kyoto (JP)

(73) Assignee: NINTENDO CO., LTD., Kyoto (JP)

(\*) Notice: Subject to any disclaimer, the term of this patent is extended or adjusted under 35 U.S.C. 154(b) by 814 days.

(21) Appl. No.: 13/100,857

(22) Filed: May 4, 2011

(65) Prior Publication Data

US 2012/0191228 A1 Jul. 26, 2012

(30) Foreign Application Priority Data

Jan. 26, 2011 (JP) ................................. 2011-013537

(51) Int. Cl.
*G06F 21/31* (2013.01)
*H04L 9/32* (2006.01)

(52) U.S. Cl.
CPC ...... *H04L 9/3239* (2013.01); *G06F 2221/2109* (2013.01); *G06F 21/31* (2013.01); *A63F 2300/204* (2013.01); *A63F 2300/405* (2013.01); *A63F 2300/532* (2013.01); *H04L 9/3236* (2013.01)

(58) Field of Classification Search
CPC ............ G06F 2221/2109; G06F 21/31; H04L 9/3236
See application file for complete search history.

(56) References Cited

U.S. PATENT DOCUMENTS

| | | | |
|---|---|---|---|
| 7,559,462 B2 * | 7/2009 | Brosnan et al. | 235/379 |
| 2007/0266179 A1 * | 11/2007 | Chavan et al. | 709/250 |
| 2008/0040808 A1 * | 2/2008 | Tokie | 726/26 |
| 2009/0037526 A1 | 2/2009 | Elliott et al. | |
| 2009/0149245 A1 * | 6/2009 | Fabbri | 463/25 |
| 2010/0122320 A1 | 5/2010 | Merati et al. | |
| 2010/0273552 A1 | 10/2010 | Kang | |

FOREIGN PATENT DOCUMENTS

| | | |
|---|---|---|
| JP | 2001-157782 | 6/2001 |
| JP | 2005-118332 | 5/2005 |
| JP | 2006-191975 | 7/2006 |
| JP | 2006-296769 | 11/2006 |
| JP | 2009-078132 | 4/2009 |
| JP | 2009-110476 | 5/2009 |
| WO | 2010/033802 | 3/2010 |

\* cited by examiner

OTHER PUBLICATIONS

Aug. 19, 2013 Search Report for EP 11164556.0, 11 pages.

*Primary Examiner* — Kris Rhu
(74) *Attorney, Agent, or Firm* — Nixon & Vanderhye, P.C.

(57) ABSTRACT

A game apparatus as an information processing apparatus includes a CPU, and the CPU generates data for generation from information specific to the game apparatus and random numbers, and calculates hash value data by using the data for generation. On the other hand, the CPU extracts the apparatus-specific information from the taken data for generation, and determines whether it is correct or not. In a case that it is determined that the apparatus-specific information is correct, hash value data is calculated by using the taken data for generation. Then, the CPU executes game processing regarding the hash value data as a parameter in a case that the taken hash value data and the calculated hash value data are coincident with each other. In a case that the apparatus-specific information is not correct or in a case that the two hash value data is not coincident with each other, the communication game is not started.

20 Claims, 13 Drawing Sheets

(A)

(B)

(A) GAME SYSTEM (B) GAME SYSTEM (A) DATA FOR GENERATION (ARRANGE IN ORDER)

(B) DATA FOR GENERATION (ARRANGE IN COMPLEX)

STORAGE MEDIUM, INFORMATION PROCESSING APPARATUS, INFORMATION PROCESSING METHOD AND INFORMATION PROCESSING SYSTEM

CROSS REFERENCE OF RELATED APPLICATION

The disclosure of Japanese Patent Application. No. 2011-13537 filed on Jan. 26, 2011 is incorporated herein by reference.

FIELD

The present invention relates to a storage medium, an information processing apparatus, an information processing method and an information processing system. More specifically, the present invention relates to a storage medium, an information processing apparatus, an information processing method and an information processing system that perform processing based on taken data.

BACKGROUND AND SUMMARY

One example of an information processing apparatus of such a kind is disclosed in Japanese Patent Application Laying-Open No. 2001-1.57782 [A63F 13/12, G06F 13/00] (document 1) laid-open on Jun. 12, 2001. In an opponent deciding system of this document 1, a computer for manager accepts participants in a network game tournament, decides opponents after the acceptance of the participants, notifies the opponent to each participant, and transmits instruction data of a game start to each of the players battling with each other. During playing the game, without using the computer for manager as a server, that is, without intervention by the computer for manager, by transmitting and receiving data between computers of the participants, the game is progressed.

Recently, cheat actions and falsification of data in a computer game are rampant, and when a network game is performed via a network, receiving opponent data falsified as it does not usually happen and playing the game have increased. Accordingly, in a case that as in the opponent deciding system disclosed in the document 1, merely, the participants are accepted to decide the opponents, and then, the game is progressed between the computers of the participants thereafter, it is difficult to prevent the falsified data from being used. Thus, in the computer of the receiving end of the falsified data, a game balance is lost, resulting in less interest in the game by the player using this computer.

Therefore, it is a primary object of the present invention to provide a novel storage medium, a novel information processing apparatus, a novel information processing method and a novel information processing system.

Furthermore, another object of the present invention is to provide a storage medium, an information processing apparatus, an information processing method and an information processing system capable of exchanging data with other apparatuses without falsification of data.

A first invention is a storage medium storing an information processing program to be executed by a computer of an information processing apparatus performing processing based on taken data, and the information processing program causes the computer to function as a processing data calculator, an outputter, an inputter, a verification data calculator, and an executor. The processing data calculator calculates processing data from predetermined data by using a predetermined one-way function. The outputter outputs the predetermined data and the processing data calculated by the processing data calculator to outside. The inputter inputs predetermined data and processing data from outside. For example, the predetermined data and the processing data that are input by the inputter are acquired from other information processing apparatuses and a storage medium detachable to the information processing apparatus. The verification data calculator calculates verification data from the predetermined data input by the inputter by using the predetermined one-way function. The executor executes predetermined processing by using the processing data when the processing data input by the inputter and the verification data calculated by the verification data calculator are coincident with each other, that is, in a case that the processing data is correct.

According to the first invention, in a case that the processing data is correct, the predetermined processing is executed by using the processing data, and therefore, it is possible to prevent the processing from being executed by using falsified data. Thus, it is possible to prevent falsification of the data itself. That is, it is possible to exchange data with the other apparatus without the falsification of the data being performed.

A second invention is according to the first invention, wherein an information processing program causes a computer to further function as a predetermined data generator and a correctness determiner. The predetermined data generator generates the predetermined data including determinable data capable of determining correctness. The correctness determiner determines correctness of the determinable data included in the predetermined data input by the inputter. The verification data calculator calculates the verification data when the correctness determiner determines to be correct.

According to the second invention, the correctness of the determinable data included in the predetermined data is further determined, and therefore, it is possible to highly prevent the processing from being executed by using falsified data.

A third invention is according to the first invention, wherein the executor executes predetermined processing by using the processing data as a parameter. Here, the parameter calculated based on the processing data may be used.

According to the third invention, the processing data is used as a parameter, and therefore, it is possible to prevent the parameter from being falsified.

A fourth invention is according to the second invention, wherein the determinable data is information specific to the information processing apparatus.

According to the fourth invention, the information specific to the information processing apparatus is used as determinable data, and therefore, it is possible to easily determine whether or not the predetermined data or the determinable data is incorrect data generated in other information processing apparatuses.

A fifth invention is according to the fourth invention, wherein the correctness determiner determines to be correct if the information specific to the information processing apparatus included in the predetermined data input by the inputter is information specific to the information processing apparatus being a source of outputs of the predetermined data and the processing data that are input by the inputter. For example, the information specific to the information processing apparatus is information representing a source of the output, such as ID of the information processing apparatus.

According to the fifth invention, the information representing the source of the output is used as information specific to the information processing apparatus, and therefore, it is possible to easily determine the correctness.

A sixth invention is according to the fourth invention, wherein the information specific to the information processing apparatus includes an MAC address of the information processing apparatus.

According to the sixth invention, the MAC address is used as information specific to the information processing apparatus, and therefore, no information need not be newly assigned, and therefore, it is possible to easily determine the correctness of the information specific to the information processing apparatus.

A seventh invention is according to the fourth invention, wherein the information specific to the information processing apparatus includes date and time information (information about year, month and date and hour, minute, second) when the predetermined data is generated. This is because it is conceived that coincidence in the time when the predetermined data is generated scarcely occurs.

According to the seventh invention, by using the date and time information when the predetermined data is generated as well, it is possible to determine the correctness of the information specific to the information processing apparatus.

An eighth invention is according to the seventh invention, wherein the correctness determiner determines to be correct if the date and time information included in the predetermined data input by the inputter does not exist date and time information being coincident with the date and time information included in the predetermined data that was input by the inputter before. However, if the date and time information is redundant, the correctness determiner determines to be incorrect.

According to the eighth invention, the date and time information included in the predetermined data is merely compared, and therefore, it is possible to easily determine the correctness.

A ninth invention is according to the fourth invention, wherein the information specific to the information processing apparatus includes processing-specific information capable of recognizing processing to be executed by the executor. For example, as processing-specific information, titles of the programs and software are relevant.

According to the ninth invention, by using the processing-specific information capable of recognizing processing to be executed by the executor as information specific to the information processing apparatus as well, it is possible to determine the correctness.

A tenth invention is according to the ninth invention, wherein the correctness determiner further determines to be correct if the processing-specific information included in the predetermined data input by the inputter represents the processing to be executed by the executor.

According to the tenth invention, whether or not the processing-specific information representing the processing to be executed by the executor is merely determined, and therefore, it is possible to easily determine the correctness of the information specific to the information processing apparatus.

An eleventh invention is according to the fourth invention, wherein the predetermined data further includes values varying at random. The values varying at random are, for example, random numbers or pseudorandom numbers.

According to the eleventh invention, the predetermined data includes values varying at random, and therefore, even the same information processing apparatus can variably calculate the processing data.

A twelfth invention is according to the first invention, wherein the predetermined one-way function is a hash function.

According to the twelfth invention, the processing data is calculated by the hash function, and therefore, it is almost impossible to know the predetermined data from the processing data, and it is possible to prevent the data from being falsified.

A thirteenth invention is according to the first invention, and the information processing apparatus is connected to a network. The outputter includes a transmitter transmitting the predetermined data and the processing data to other information processing apparatuses on the network. The inputter includes a receiver receiving the predetermined data and the processing data from other information processing apparatuses on the network.

According to the thirteenth invention, it is possible to exchange the predetermined data and the processing data by communications.

A fourteenth invention is an information processing apparatus performing processing based on taken data, and comprises a processing data calculator, an outputter, an inputter, a verification data calculator, and an executor. The processing data calculator calculates processing data from predetermined data by using a predetermined one-way function. The outputter outputs the predetermined data and the processing data calculated by the processing data calculator to outside. The inputter inputs predetermined data and processing data from outside. The verification data calculator calculates verification data from the predetermined data input by the inputter by using the predetermined one-way function. The executor executes predetermined processing by using the processing data when the processing data input by the inputter and the verification data calculated by the verification data calculator are coincident with each other.

A fifteenth invention is an information processing method of an information processing apparatus performing processing based on taken data, including following steps of: (a) calculating processing data from predetermined data by using a predetermined one-way function; (b) outputting the predetermined data and the processing data calculated by the step (a) to outside; (c) inputting predetermined data and processing data from outside; (d) calculating verification data from the predetermined data input by the step (c) by using the predetermined one-way function; and (e) executing predetermined processing by using the processing data when the processing data input by the step (c) and the verification data calculated by the step (d) are coincident with each other.

A sixteenth invention is an information processing system having at least two information processing apparatuses performing processing based on taken data, each of the information processing apparatuses comprises a processing data calculator, an outputter, an inputter, a verification data calculator, and an executor. The processing data calculator calculates processing data from predetermined data by using a predetermined one-way function. The outputter outputs the predetermined data and the processing data calculated by the processing data calculator to outside. The inputter inputs predetermined data and processing data from outside. The verification data calculator calculates verification data from the predetermined data input by the inputter by using the predetermined one-way function. The executor executes predetermined processing by using the processing data when the processing data input by the inputter and the verification data calculated by the verification data calculator are coincident with each other.

In the fourteenth to sixteenth inventions as well, similar to the first invention, it is possible to exchange data with the other apparatus without falsification of the data.

A seventeenth invention is a storage medium storing a game program to be executed by a computer of a game apparatus performing processing based on taken data, and the game program causes a computer to function as a processing data calculator, an outputter, an inputter, a verification data calculator, and a game executor. The processing data calculator calculates processing data from predetermined data including values varying at random by using a predetermined one-way function. The outputter outputs the predetermined data and the processing data calculated by the processing data calculator to outside. The inputter inputs predetermined data including values varying at random and processing data from outside. The verification data calculator calculates verification data from the predetermined data input by the inputter by using the predetermined one-way function. The game executor executes game processing by using the processing data when the processing data input by the inputter and the verification data calculated by the verification data calculator are coincident with each other, that is, in a case that the processing data is correct. In the invention of this game program, the predetermined data includes values varying at random, and therefore, the processing data generated from the predetermined data are varied every time.

An eighteenth invention is a game apparatus performing processing based on taken data, and comprises a processing data calculator, an outputter, an inputter, a verification data calculator, and a game executor. The processing data calculator calculates processing data from predetermined data including values varying at random by using a predetermined one-way function. The outputter outputs the predetermined data and the processing data calculated by the processing data calculator to outside. The inputter inputs predetermined data including values varying at random and processing data from outside. For example, the predetermined data and the processing data that are input by the inputter are acquired from other game apparatuses and a storage medium detachable to the game apparatuses. The verification data calculator calculates verification data from the predetermined data input by the inputter by using the predetermined one-way function. The game executor executes game processing by using the processing data when the processing data input by the inputter and the verification data calculated by the verification data calculator are coincident with each other, that is, in a case that the processing data is correct.

A nineteenth invention is a game controlling method of a game apparatus performing processing based on taken data, including following steps of: (a) calculating processing data from predetermined data including values varying at random by using a predetermined one-way function; (b) outputting the predetermined data and the processing data calculated by the step (a) to outside; (c) inputting predetermined data including values varying at random and processing data from outside; (d) calculating verification data from the predetermined data input by the step (c) by using the predetermined one-way function; and (e) executing game processing by using the processing data when the processing data input by the step (c) and the verification data calculated by the step (d) are coincident with each other.

A twentieth invention is a game system having at least two game apparatuses performing processing based on taken data, and each of the game apparatuses comprises a processing data calculator, an outputter, an inputter, a verification data calculator, and a game executor. The processing data calculator calculates processing data from predetermined data including values varying at random by using a predetermined one-way function. The outputter outputs the predetermined data and the processing data calculated by the processing data calculator to outside. The inputter inputs predetermined data including values varying at random and processing data from outside. For example, the predetermined data and the processing data that are input by the inputter are acquired from other game apparatuses and a storage medium detachable to game apparatuses. The verification data calculator calculates verification data from the predetermined data input by the inputter by using the predetermined one-way function. The game executor executes game processing by using the processing data when the processing data input by the inputter and the verification data calculated by the verification data calculator are coincident with each other, that is, in a case that the processing data is correct.

In the seventeenth to twentieth inventions as well, similar to the first invention, it is possible to exchange data with the other apparatus without falsification of the data.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) shows a top surface in a closed state, FIG. 2(B) shows a left side surface in the closed state, FIG. 2(C) shows a front surface in the closed state, FIG. 2(D) shows a right side surface in the closed state, FIG. 2(E) shows a back surface in the closed state, and FIG. 2(F) shows a bottom surface in the closed state;

FIG. 6(A) shows a state that a parallax barrier is turned on (3D display), and FIG. 6(B) shows a state that a parallax barrier is turned off (2D display);

DETAILED DESCRIPTION OF THE PREFERRED EMBODIMENTS

Figure 1:
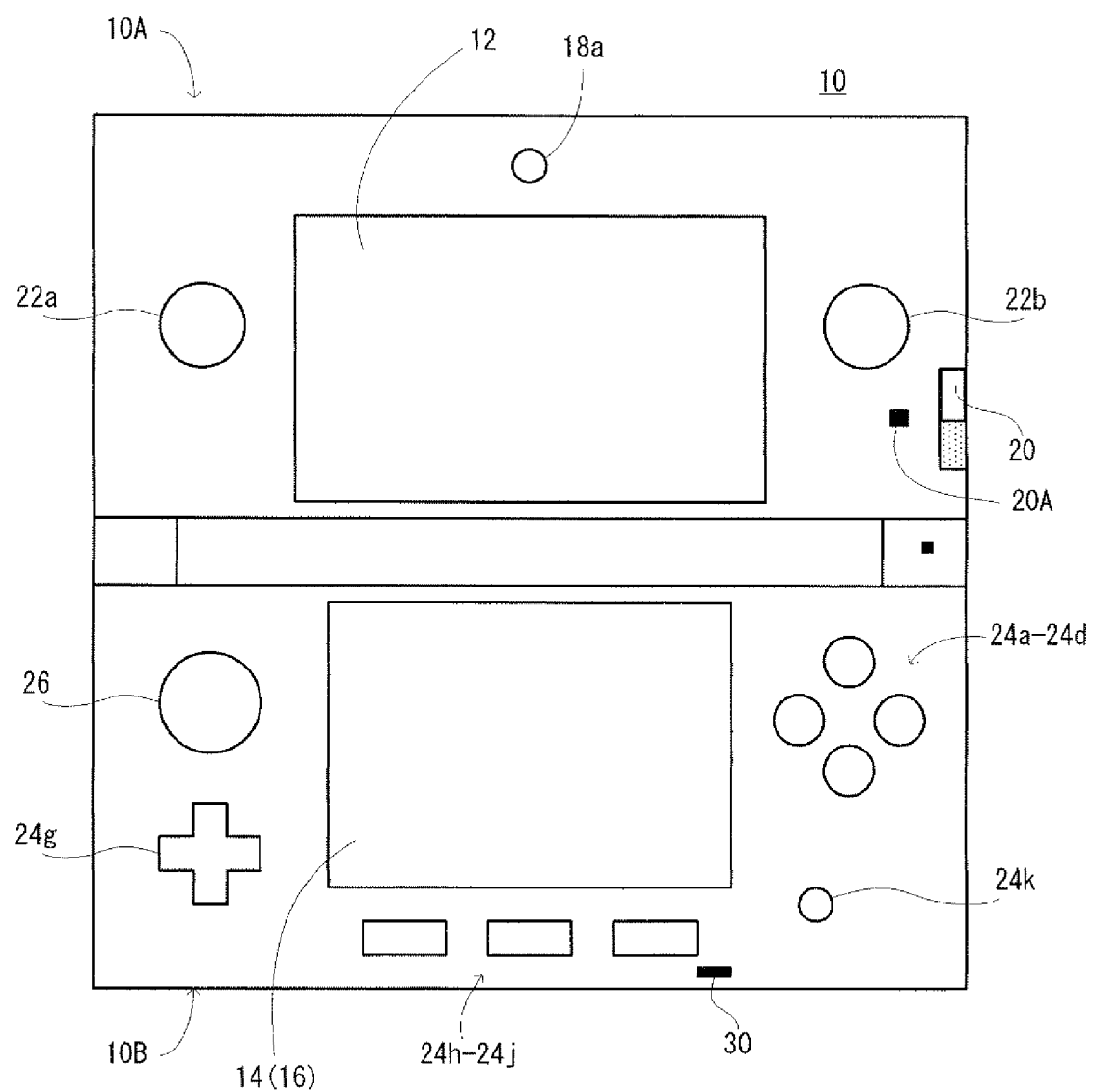
FIG. 1 is an illustrative view showing an external view of a game apparatus of one embodiment of the present invention, and shows a front surface in an opened state.
Figure 2:
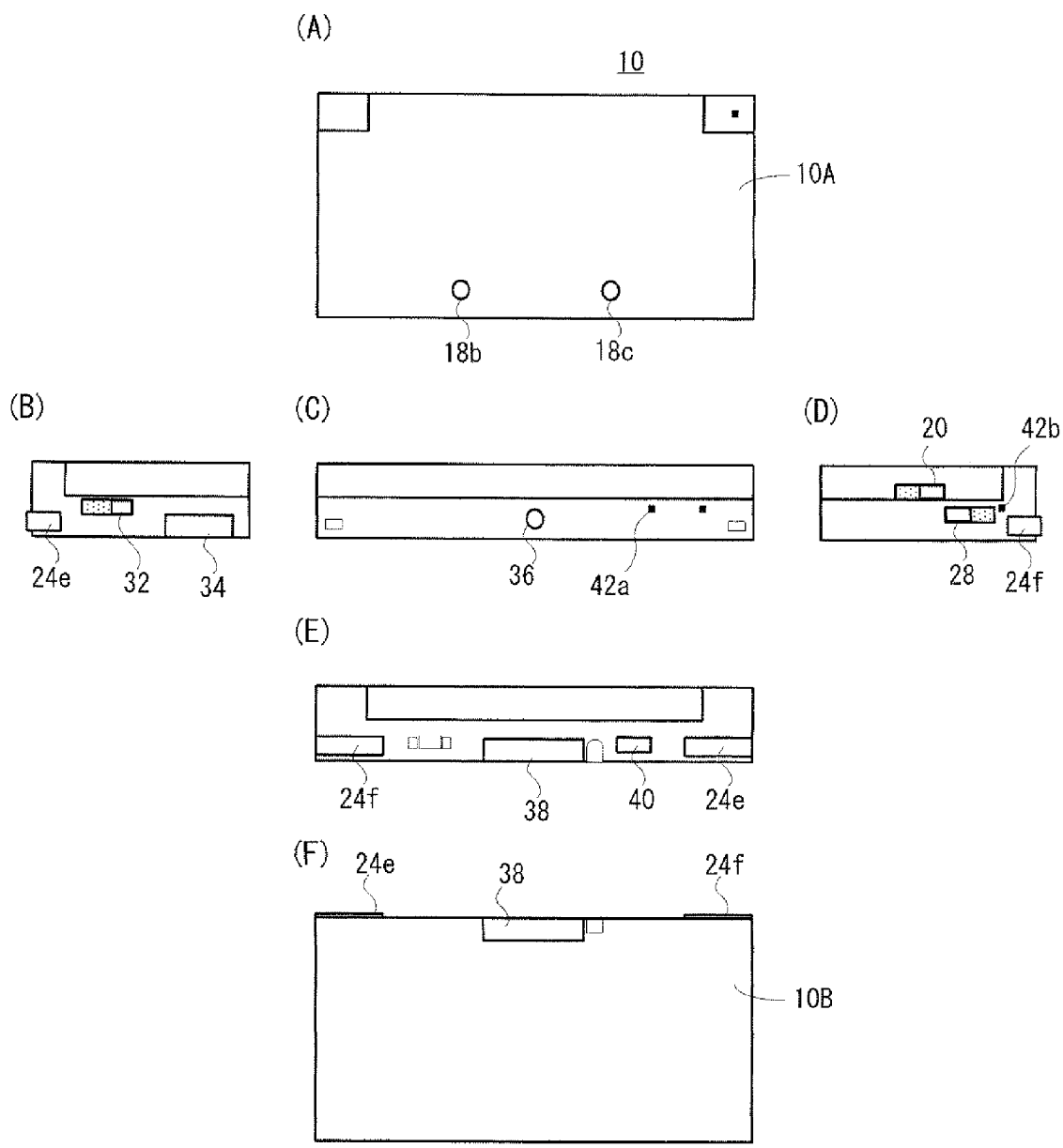
FIG. 2 is an external view of the game apparatus.

FIG. 1 and FIG. 2 show an appearance of the game apparatus 10 being one embodiment of the present invention. The game apparatus 10 is a foldable game apparatus, FIG. 1 shows a front of the game apparatus 10 in an opened state, FIG. 2 (A) to FIG. 2 (F) respectively shows a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a-24d, a cross key (button) 24g, home, select, start buttons 24h-24j, a power button 24k, an analog pad 26, and a microphone 30 are provided.

Furthermore, as shown in FIG. 2 (A), on the top surface of the game apparatus 10 (reverse side of the upper housing 10A shown in FIG. 1), right and left outward cameras 18b and 18c compliant with 3D imaging are provided. Furthermore, as shown in FIG. 2 (C), on the front surface of the game apparatus 10, a headphone terminal 36, a power lamp 42a, etc. are provided. Also, as shown in FIG. 2 (B), FIG. 2 (E) and FIG. 2 (D), from the left side surface to the back surface of the game apparatus 10, an L button 24e is provided, and from the right side surface to the back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are further provided. The above-described 3D adjusting switch 20 is exposed from the right side surface. In addition, on the back surface of the game apparatus 10, an infrared ray emitting-receiving portion 40, etc. is further provided. Then, as shown in FIG. 2 (E) and FIG. 2 (F), from the back surface to a bottom surface, a game card slot 38 is provided.

Figure 6:
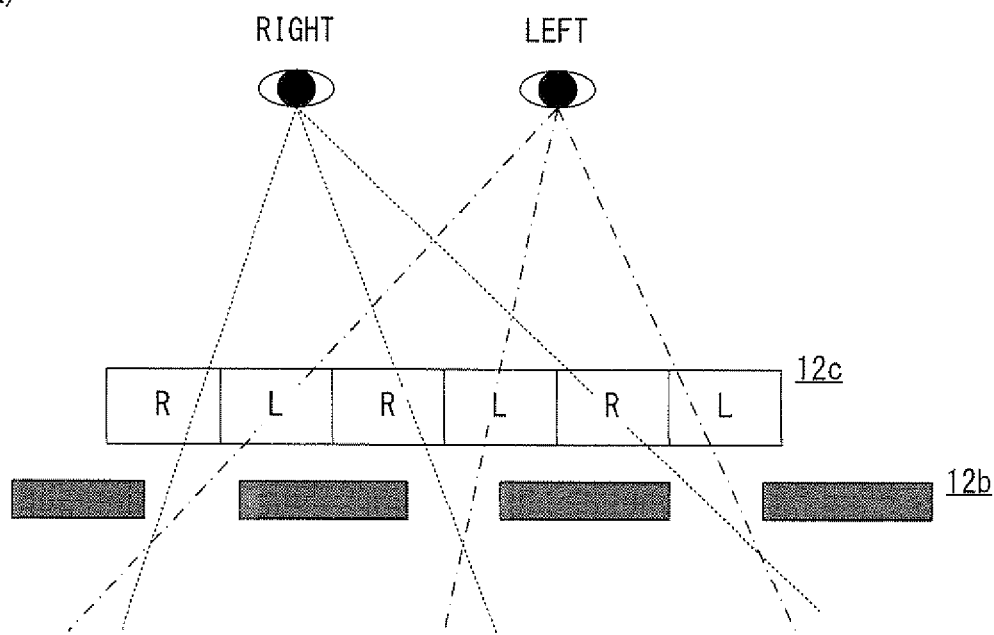
FIG. 6 is an illustrative view for describing a principle of 3D/2D display in a parallax barrier method.
Figure 6:
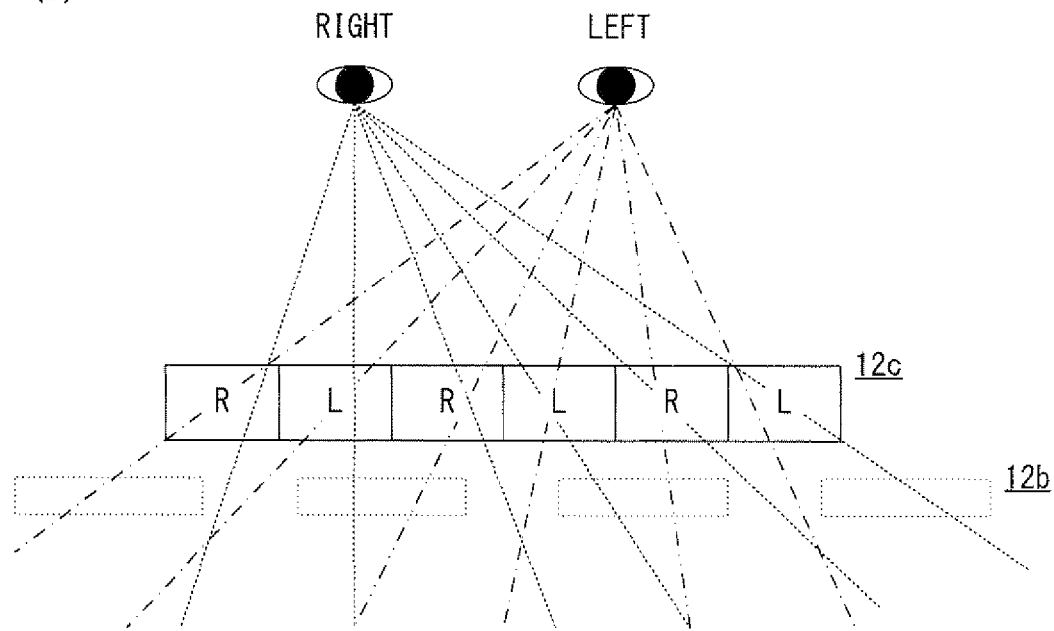

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging the player can be used as an image input to an application program such as a game program. In this case, the game program detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
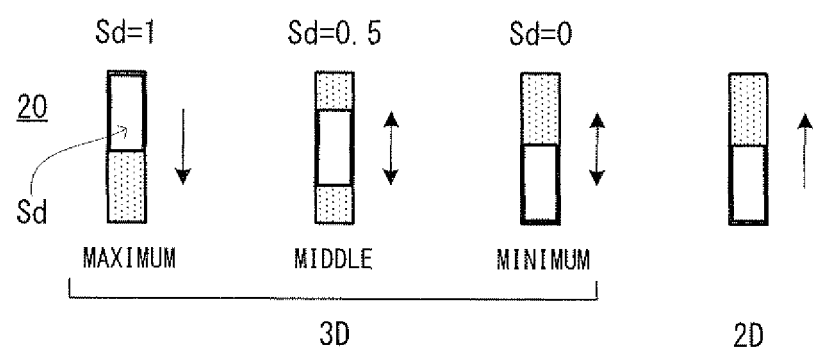
FIG. 3 is an illustrative view illustrating an operation of a 3D adjusting switch.

The 3D adjusting switch 20 manually switches the display of the stereoscopic LCD 12 between the 3D display and the 2D display, and is a slide switch for manually adjusting a three-dimensional effect in the 3D display as well and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved down.

Although the detailed description is made later, such a change of the three-dimensional effect of the 3D display is implemented by changing the distance (distance-between cameras D) between the right and left virtual cameras (not illustrated) arranged in the virtual space. That is, according to an operation of the 3D adjusting switch 20, the distance-between cameras D is adjusted. Then, the distance-between cameras D undergoes an automatic adjustment by the game program as well as the manual adjustment.

The 3D lamp 20A is a lamp showing a displaying condition of the stereoscopic LCD 12, and lights up in the 3D display and light off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program. The power button 24k is used for turning on or off the power of the game apparatus 10. The power lamp 42a lights up or off in conjunction with the power-on or the power-off of the power source.

The microphone 30 converts a speech voice by a player, an environmental sound, etc. into sound data. The sound data can be used as a sound input to the game program. In this case, the game program detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for saving a camera image, a microphone sound, etc., and the game card slot 38 is attached with a game card (not illustrated) storing the game program, etc. The infrared ray emitting-receiving portion 40 is utilized for infrared rays (IR) communications with other game apparatuses.

Figure 4:
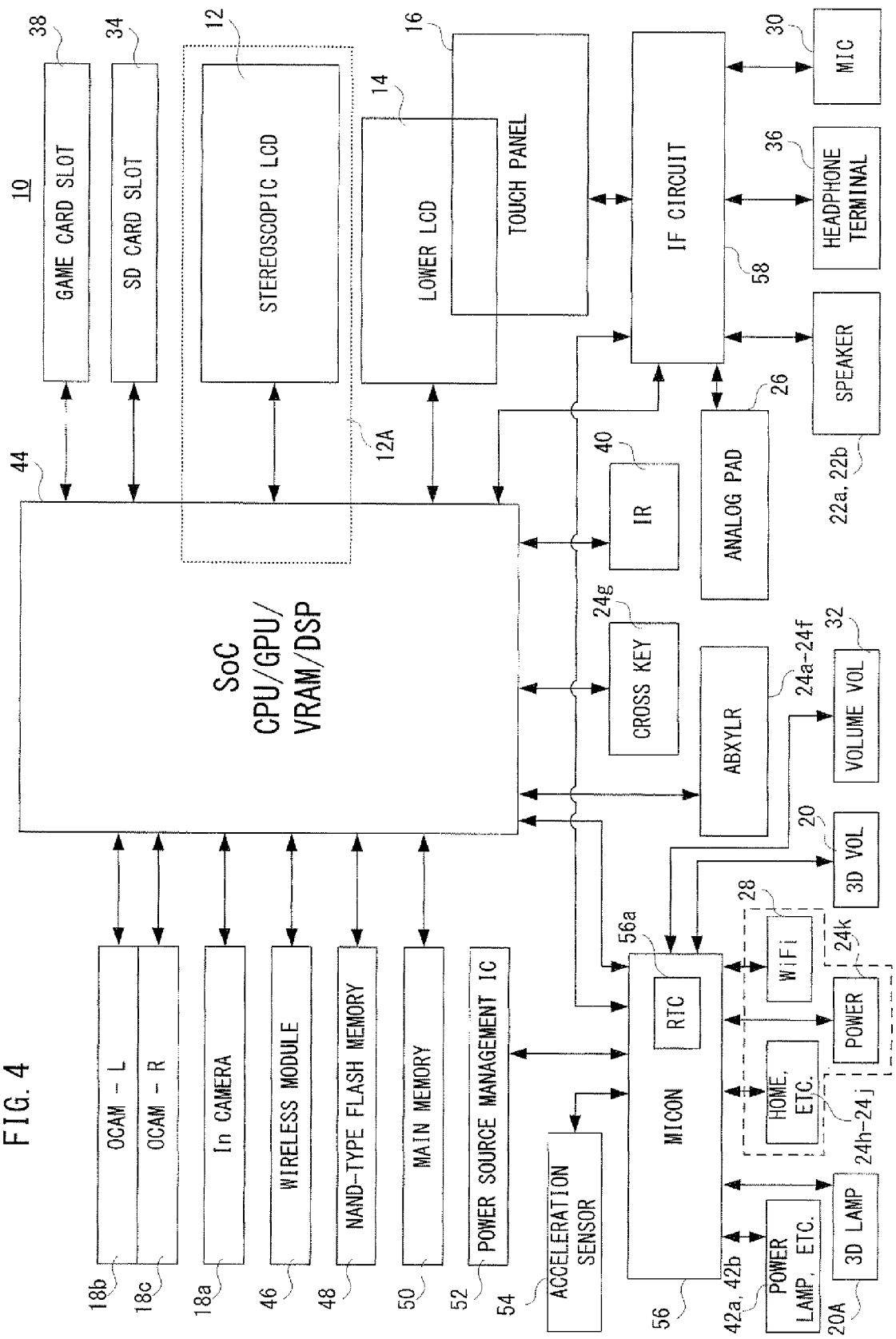
FIG. 4 is a block diagram showing one example of an electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving portion (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. Accordingly, although illustration is omitted, the game apparatus 10 can communicate with other game apparatuses 10 and computers directly or via a network. The NAND-type flash memory 48 stores data for save, such as a camera image, a microphone sound, etc. The main memory 50 gives a working area to the SoC 44. That is, in the main memory 50, various data and programs to be utilized in the application such as a game, etc. are stored, and the SoC 44 performs works by utilizing the data and programs stored in the main memory 50.

The microcomputer 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result by the acceleration sensor 54 can be used as a motion input to the game program. In this case, the game program calculates the motion of the game apparatus 10 itself on the basis of the detection result, and executes processing according to the calculation result. Furthermore, the microcomputer 56 includes an RTC (real-time clock) 56a, and counts a time by the RTC 56a to supply the same to the SoC 44.

Figure 5:
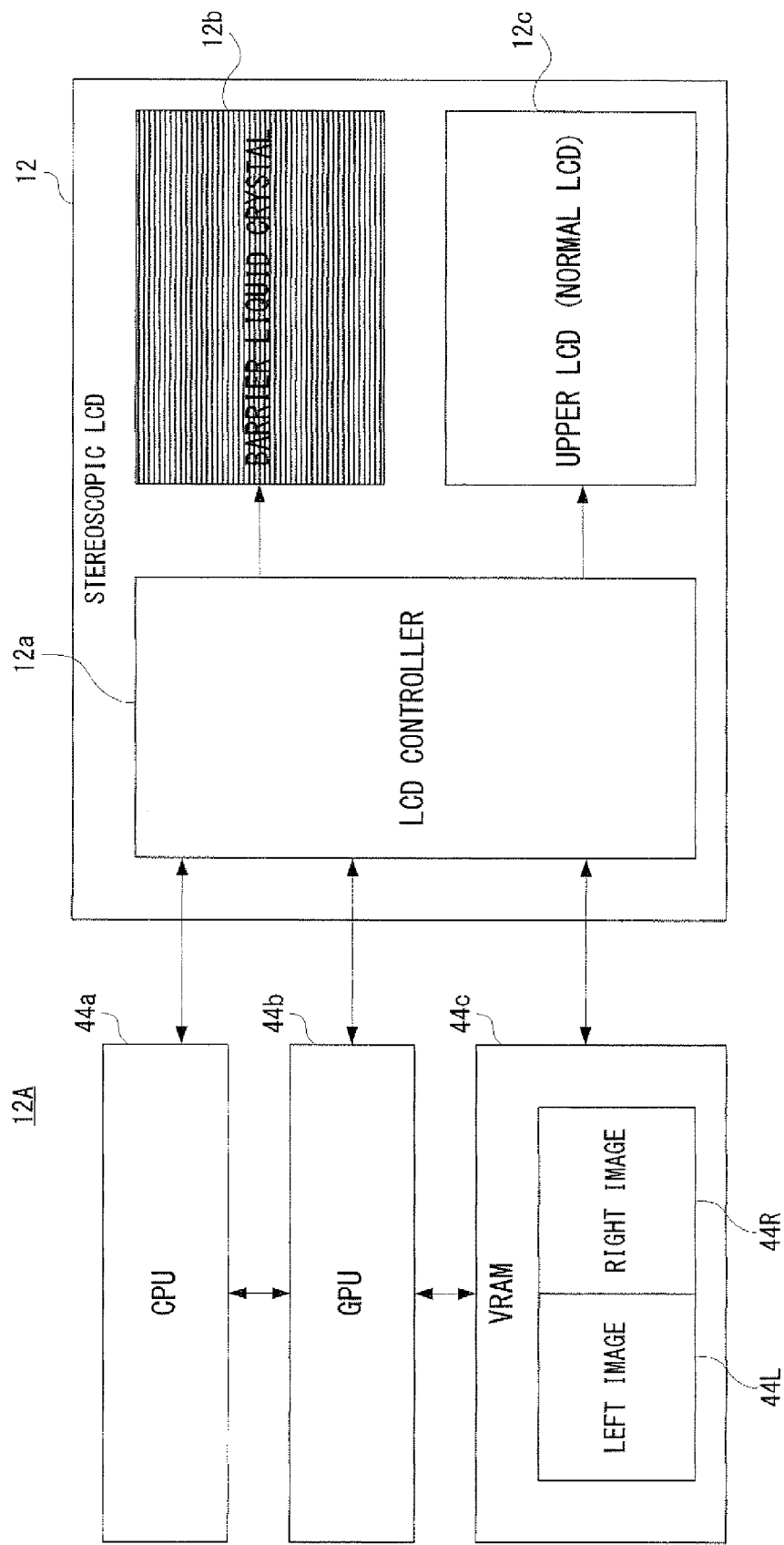
FIG. 5 is a block diagram showing an important part of an electric configuration in FIG. 4 (stereoscopic LCD controller being made up of a stereoscopic LCD and a part of SoC)

FIG. 5 shows a stereoscopic LCD controller 12A being made up of the stereoscopic LCD 12 and a part of the SoC 44. The stereoscopic LCD 12 includes an LCD controller 12a, a barrier liquid crystal 12b and an upper LCD 12c. The harrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits. The upper LCD 12c may be a general liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage) on and off. When the barrier liquid crystal 12b is turned off, the right eye and the left eye can view the beams passing through the pixels of all the rows on the upper LCD 12e as shown in FIG. 6(B).

Here, FIG. 5 shows that the LCD controller 12a, the GPU 44b and the VRAM 44c are provided by bringing them into correspondence with the stereoscopic LCD 12, and naturally, the LCD controller, the GPU and the VRAM are also provided bringing them into correspondence with the lower LCD 14. As can be understood from FIG. 5, the CPU corresponding to the lower LCD 14 is also connected to the CPU 44a so as to be able to transmit and receive signals, and the GPU corresponding to the lower LCD 14 and the VRAM are connected with each other to be able to transmit and receive signals. Then, the CPU 44a, the GPU corresponding to the lower LCD 14 and the VRAM each is connected to the LCD controller corresponding to the lower LCD 14 so as to be able to transmit and receive signals, so that the lower LCD 14 is connected to this LCD controller.

For example, when the power button 24k is turned on, and the power source of the game apparatus 10 is turned on, the game apparatus 10 is booted up to display a main menu screen not shown on the lower LCD 14. On the main menu screen, execution of the application, such as a virtual game, etc. to be executable in the game apparatus 10 can be instructed. Furthermore, depending on the kind of the virtual game, by making communications with tow or more game apparatuses 10, a virtual game (communication game) can be played.

Figure 7:
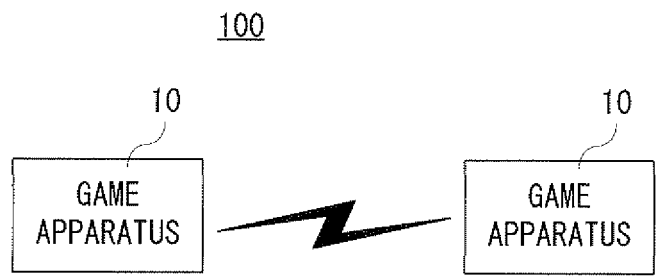
FIG. 7 is an illustrative view showing an example of a game system by using the game apparatus shown in FIG. 1.
Figure 7:
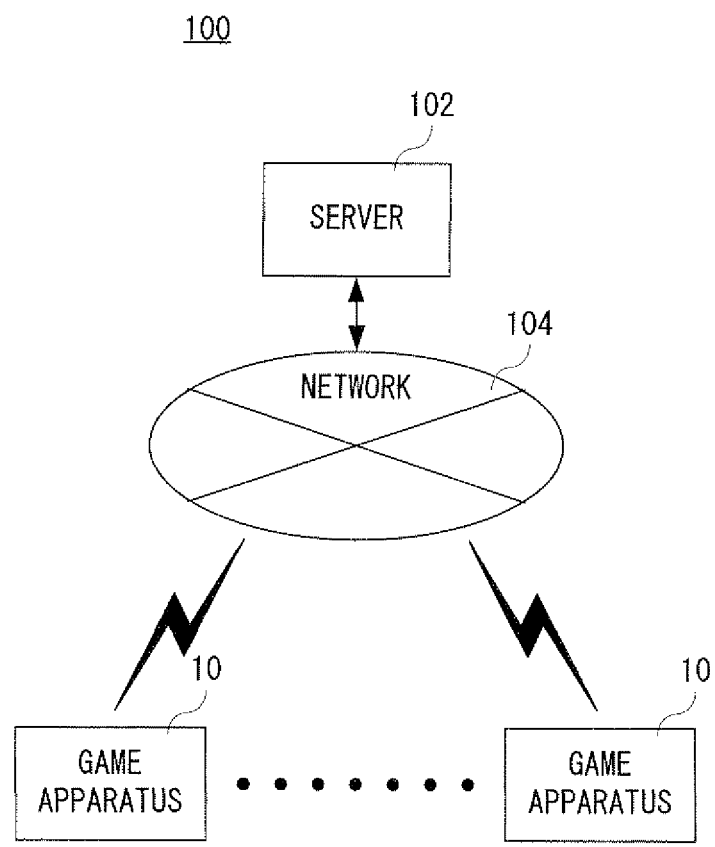

FIG. 7(A) and FIG. 7(B) show the example of a game system 100 in a ease that a communication game is played. The game system 100 shown in FIG. 7(A) includes two game apparatuses 10, and direct communications are made between the two game apparatuses 10. Although illustration is omitted, the game system 100 (network) may be constructed by three or more game apparatuses 10. In such a case, any one of the game apparatuses 10 functions as a parent device, and the other game apparatuses 10 function as child devices. For example, the game apparatus 10 as a parent device invites the game apparatus 10 as a child device being a participant in the communication game, accepts a request for participation from the game apparatus 10 as a child device, and decides the game apparatus 10 being an opponent. When the opponent game apparatus 10 is decided, the communication game is executed between the game apparatus 10 as a parent device and the game apparatus 10 as a child device being the opponent.

Furthermore, the game system 100 shown in FIG. 7(B) includes two or more game apparatuses 10, and each game apparatus 10 is connected to a server 102 via a network 104 such as the Internet. For example, the server 102 functions as a matching server, accepts a request for participation from each of the game apparatuses 10, and decides each of the opponent game apparatuses 10. When the opponent is decided, and a communication play (communication game) is started, communications are made between the each other's opponent game apparatuses 10 via the network 104. Here, in such a case as well, any one of the game apparatuses 10 functions as a parent device, and the other game apparatus 10 functions as a child device.

Here, even after the communication game is started, the communication game may be progressed via the server 102. In such a case, the server 102 functions as a parent device, and each game apparatus 10 that makes the communication game functions as a child device. Moreover, in such a case, operation data is transmitted from each game apparatus 10 being the opponent to the server 102 via the network 104, and in the server 102, the game processing is executed, and data about the result is transmitted to each of the aforementioned game apparatuses 10 being the opponent. Here, the server 102 may receive data about the execution result of the game processing in each of the game apparatuses 10, unify them, and transmit data about the unified result to each of the game apparatuses 10.

In such a game apparatus 10, prior to starting the communication game, a player character to be used by each player is generally selected. In such a case, the player himself or herself selects the player character, or the computer (the CPU 44a of the game apparatus 10 as a parent device) selects the player character. At this time, the data (game data) as to the individuality (attribute) of the player character is exchanged among the game apparatuses 10 which make the communication game.

However, recently, incidents of receiving game data falsified as it does not usually happen and playing a communication game have been increasing. This is because that the opponent with whom the player became acquainted in the event site and the opponent with whom the server 102 matches uses the falsified data cannot be determined. Due to this, on the side of the game apparatus 10 which receives the falsified game data, a game balance is lost, and the player who is cheated like the player of this game apparatus 10 has little interest in the game.

Thereupon, in this embodiment, prior to the start of the communication game, whether the falsified game data or not is determined, that is, correctness of the game data is determined, and only when it is determined to be correct, the communication game can be performed.

Figure 8:
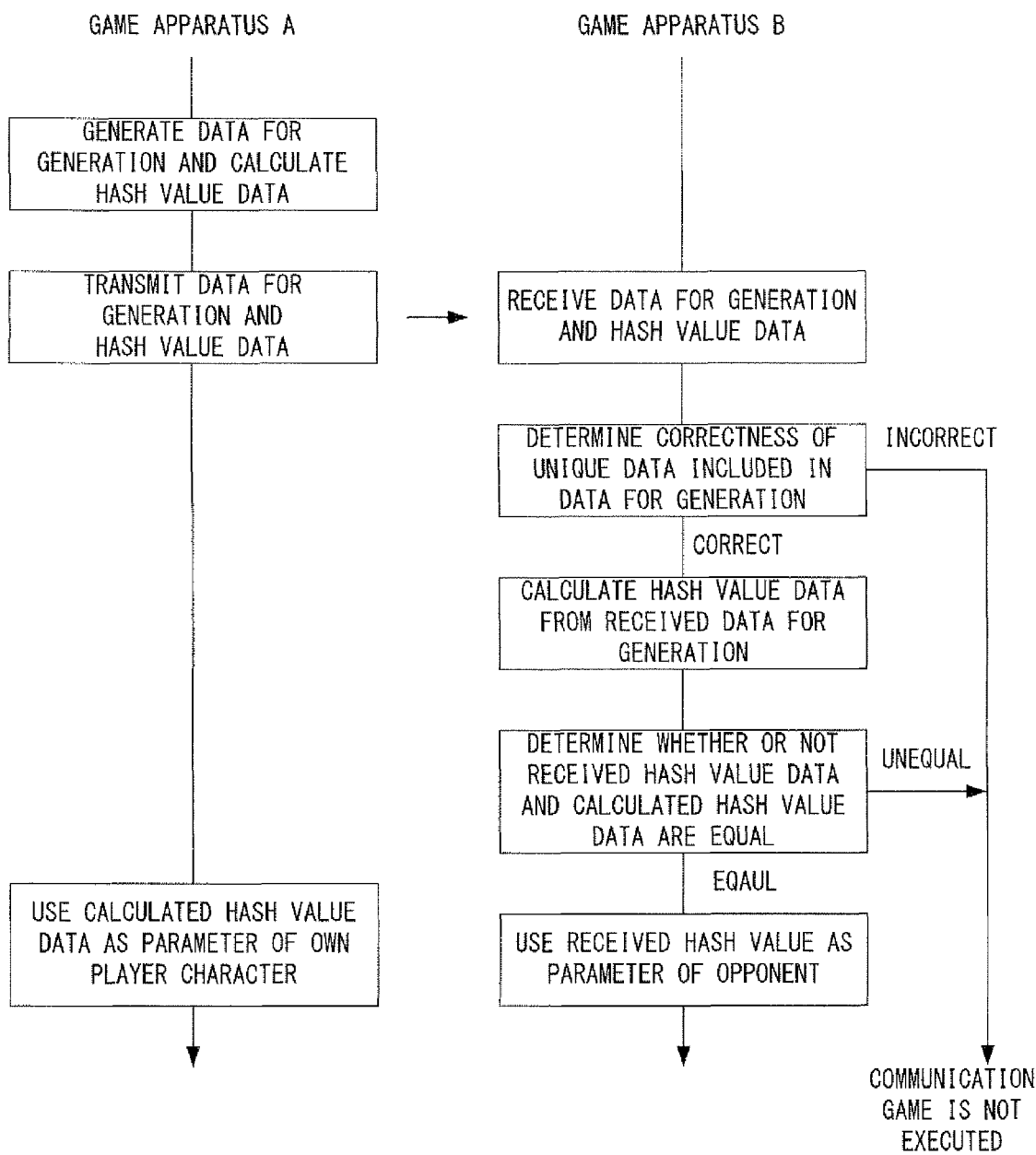
FIG. 8 is an illustrative view describing a diagrammatic sketch of authentication processing to be executed by two game apparatuses.

First, by utilizing FIG. 8, authentication processing of determining the correctness of the game data executed between the two game apparatuses 10 is roughly explained. However, in a case that the number of game apparatuses 10 forecasting to participate in the communication game is equal to or more than three, the authentication processing is executed between the game apparatus 10 as a parent device and each of the game apparatuses 10 as child devices.

Here, out of the two game apparatuses 10, one game apparatus 10 is called a "game apparatus A", and the other game apparatus 10 is called a "game apparatus B". As shown in FIG. 8, the game apparatus A first generates data for generation to thereby calculate hash value data. Here, the data for generation is data (unique data) about information specific to the game apparatus A (apparatus-specific information) and alternative value data. In this embodiment, the apparatus-specific information is an MAC address of the game apparatus A. Furthermore, random numbers are utilized as alternative values. Here, pseudo-random numbers may be used.

Figure 9:
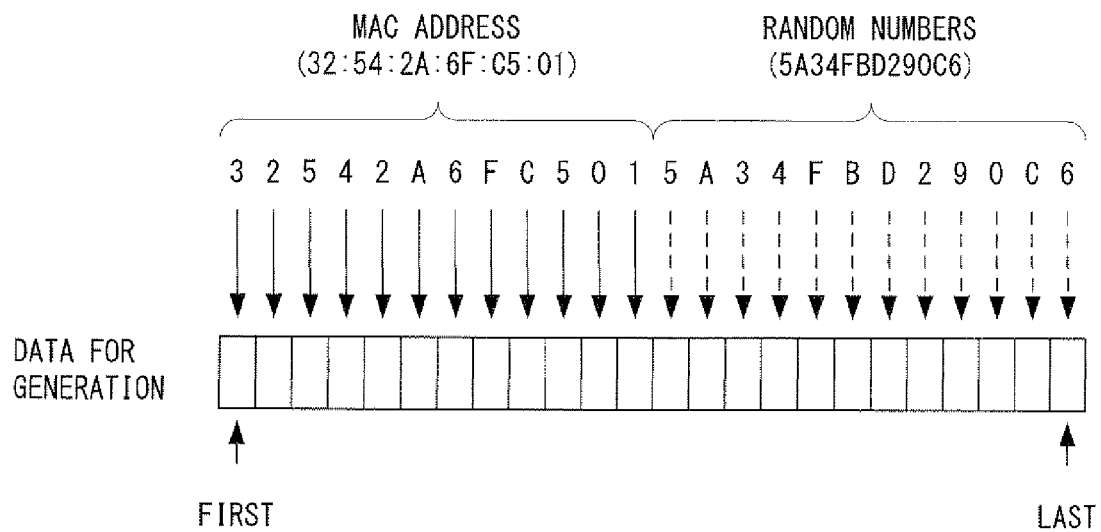
FIG. 9 is an illustrative view showing a detailed example of data for generation.
Figure 9:
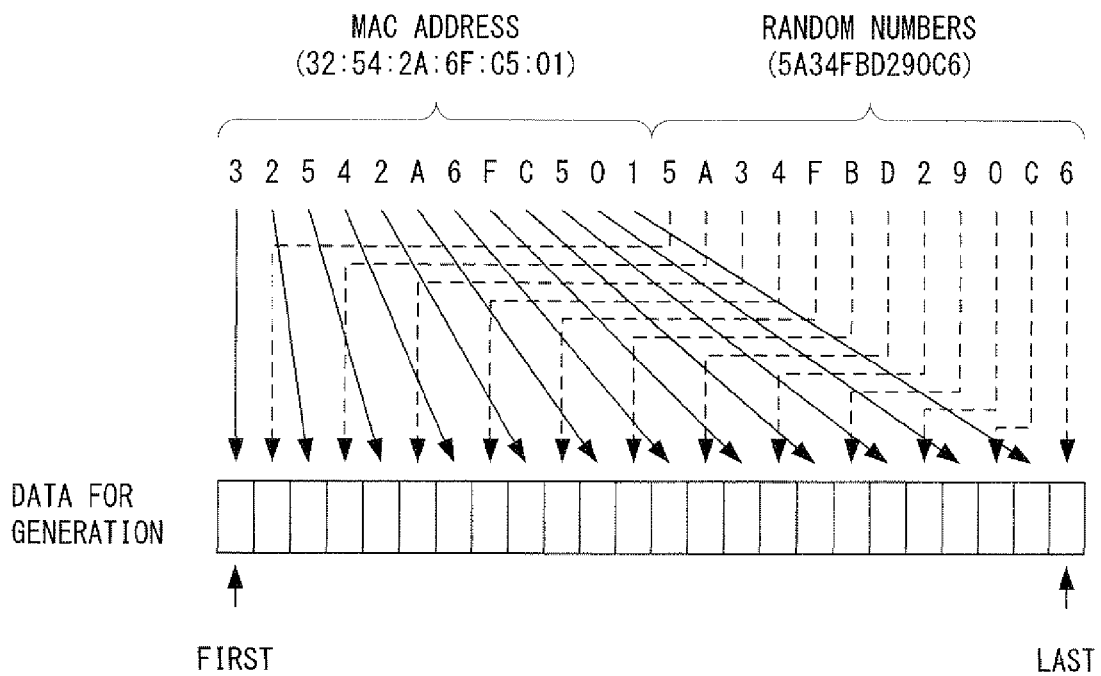

The data for generation is constructed of a register of the predetermined number of bits, and is generated by arranging the above-described unique data about the apparatus-specific information and data about the random numbers (random number data) in series. For example, as shown in FIG. 9(A), the data for generation is constructed of a register of 96 bits (4 bits×24). Here, in FIG. 9(A), one quadrangle frame is represented by each four bits (½ octet). This is because that the alphanumeric characters corresponding to the unique data and random numbers data are represented by hexadecimal number (0-9 and A-F).

As shown in FIG. 9(A), the data values corresponding to the alphanumeric characters of the MAC address are stored from the first quadrangle frame including the highest-order bit in order, and the data values corresponding to the alphanumeric characters of the random numbers are stored thereafter to the last quadrangle frame including the lowest-order bit. In the example shown in FIG. 9(A) (this holds true in FIG. 9(B)), the MAC address is "32:54:2A:6F:C5:01", and the random numbers are "5A34FBD290C6".

Here, as described later, in the authentication processing of the receiving end, unique data is extracted from the data for generation, and the correctness is determined, and therefore, the bits to be read out of the data for generation and the reading order are decided in advance. Accordingly, as shown in FIG. 9(A), the data values corresponding to the alphanumeric characters of the MAC address and the random numbers need not be arranged in series, and can be arranged in complex. For example, as shown in FIG. 9(B), the data values corresponding to the alphanumeric characters of the MAC address and the data values corresponding to the alphanumeric characters of the random numbers may alternately be stored for each four bits included in the quadrangle frame. In such a case, the data value of the four bits included in the odd-numbered quadrangle frames including the first quadrangle frame is sequentially taken from the first to thereby extract the unique data.

Returning to FIG. 8, by utilizing the data for generation thus generated, calculation is performed by a hash function to thereby calculate data of the hash value (hash value data). In this embodiment, the hash function is used as an example of a one-way function, but SHA-1, SHA -256, and MD5 can be utilized. Furthermore, the one-way function, such as factorization in prime numbers and discrete logarithm may be utilized. The calculated hash value data is utilized as a parameter of the own apparatus in the communication game. Here, as described later, the hash value data can be utilized for calculating the parameter.

In this embodiment, by the parameter, the individuality or the attribute of the player character is decided. Accordingly, in this embodiment, the random number data is included in the data for generation. This is because that in a case that the data for generation is generated only by the unique data, when fixed information like the MAC address is used as apparatus-specific information, the player character having the same individuality will be generated every time, so that the virtual game may become monotonous. Here, by the parameter, the kind of the player character may be decided.

The reason why the hash value data is utilized as a parameter is that it is almost impossible to know the original data for generation from the hash value data, and for preventing incorrect game data (parameter) from being generated. That is, this is for preventing data from being falsified.

Furthermore, the generated data for generation and the calculated hash value data are transmitted to the game apparatus B. For example, the data to be transmitted (transmission data) at this time includes header information and in the successive field, the data for generation and the hash value data are included. The header information includes own identifying information (ID or/and MAC address in the communication game) in the communication game, connection information (IP address), a name of the game apparatus (player), identification information of a virtual game (game title), and current time (including year, month, and day) information, etc.

The game apparatus B receives (acquires) the data for generation and the hash value data transmitted from the game apparatus A, extracts the unique data included in the data for generation, and determines the correctness thereof. In this embodiment, the apparatus-specific information is an MAC address, and the MAC address is also included in the header information of the transmission data as described above. Thus, in the determination of the correctness, whether or not the MAC address included in the header information and the MAC address corresponding to the unique data are coincident with each other is determined. In this case, if these two MAC addresses are coincident with each other, it is determined that the unique data is correct, but if these are not coincident with each other, it is determined that the unique data is incorrect.

Here, the header information of the transmission data is alternative, and the falsified incorrect data for generation may be transmitted. Accordingly, in this embodiment, the MAC address when the two MAC address are coincident is stored in the list (communication allowance list). Then, in determination of the correctness of the unique data, it is first determined whether or not the MAC address corresponding to the unique data is coincident with the MAC address stored in the communication allowance list. This is because that coincidence of the MAC addresses among a plurality of game apparatuses 10 basically never occurs. In a case that the MAC address (MAC address included in the header information of the transmission data may be possible) corresponding to the unique data included in the received data for generation is coincident with the MAC address stored in the communication allowance list, it is determined that these are incorrect data for generation falsified and so on. Accordingly, even the MAC address registered once in the communication allowance list is deleted from the communication allowance list if the data for generation including the same MAC address is received thereafter, that is, if it is determined that the data for generation is incorrect thereafter.

In a case that the unique data is correct, the game apparatus B calculates hash value data by performing the calculation with a hash function by utilizing the received data for generation. Here, the hash functions to be utilized in the game apparatus A and the game apparatus B are the same. Then, the game apparatus B determines whether or not the received hash value data and the calculated hash value data are equal to each other. In a case that these two hash value data is equal, the game apparatus B determines that the data for generation is correct, and in the subsequent communication game, the received hash value data is used as a parameter of the opponent (game apparatus A, here). On the other hand, in a case that these two hash value data is not equal to each other, the game apparatus B determines that the data for generation is incorrect.

In a case that it is determined that the unique data or the data for generation is incorrect, the communication game is not performed. At this time, the game apparatus B displays a message that the received data is incorrect data falsified and so on, and the communication game cannot be played on the lower LCD 14 (stereoscopic LCD 12 may be possible), a sound indicating this (sound effect, music) is output from the speakers 22a, 22b, or both of them may be executed.

Furthermore, in a case that it is determined that both of the unique data and the data for generation are correct, the above-described processing is performed by exchanging the game apparatus A with the game apparatus B. Such authentication processing is executed between the parent device and each of all the child devices, and among the plurality of game apparatuses 10 about each of which it is determined that both of the unique data and the data for generation are correct, the communication game is started. For example, the parent device determines that the child device having the MAC address described in the communication allowance list can participate in the communication game, and starts the communication game with the child device which can participate. At this time, each child device receives (acquires) connection information and hash value data of other child devices from the parent device. Accordingly, in each of the game apparatuses 10 which make the communication game, the hash value data is used as a parameter, and the individuality (attribute) of the player character is decided. Here, the hash value data calculated in the own apparatus is used as to the player character of the own apparatus, and the hash value data calculated in the other apparatus is used as to the player character of the other apparatus.

For example, as individuality or an attribute of the player character, strength (offensive skill, defensive skill, physical strength, etc.), quickness, charm, color of skin, a size and a growth rate, etc. of the player character are relevant. For example, in a case that the hash value is small, the player character is weak, and in a case that the hash value is great, the player character is strong.

Furthermore, according to an equation 1, for example, the parameter may be generated (calculated) by using the hash value. Here, in place of an experience point of the player character, a level of the player or the player character may be used. Furthermore, a and b are constants, and varied in correspondence with the hash value.

$$\text{parameter} = a * (\text{experience point}) + b \quad \text{[Equation 1]}$$

Accordingly, even if the same player character is selected, different individuality or attributes can be set depending on the difference in the hash value and the experience point.

Figure 10:
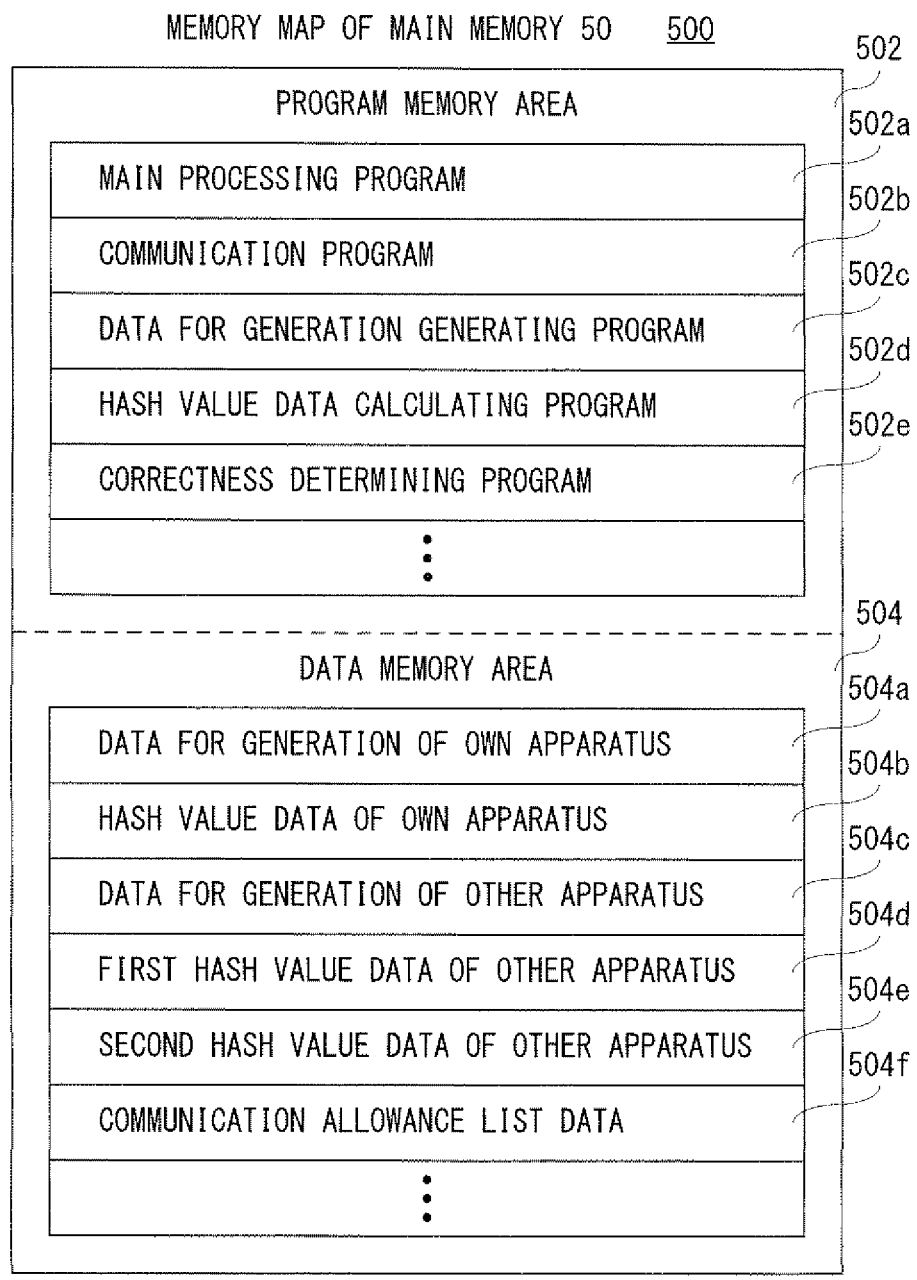
FIG. 10 is an illustrative view showing a memory map of a main memory shown in FIG. 4.

FIG. 10 is an illustrative view showing an example of a memory map 500 of a main memory 50 shown in FIG. 4. As shown in FIG. 10, the main memory 50 includes a program memory area 502 and a data memory area 504. In the program memory area 502, an information processing program (including the game program) of this embodiment is stored, and the game program is made up of a main processing program 502a, a communication program 502b, a data for generation generating program 502c, a hash value data calculating program 502d, a correctness determining program 502e, etc.

The main processing program 502a is a program for processing a main routine of the virtual game. The communication program 502b is a program for making a communication with other game apparatuses 10 and computers. The data for generation generating program 502c is a program for generating data for generation from the apparatus-specific information and the random numbers.

The hash value data calculating program 502d is a program for calculating hash value data by performing the calculation with the hash function by using the data for generation generated according to the data for generation generating program 502c and the data for generation received from other game apparatus 10. The correctness determining program 502e is a program for determining correctness of the received data for generation and the unique data included therein.

Although illustration is omitted, in the program memory area 502, a backup program, a sound output program, etc. also stored. The backup program is a program for storing (saving) game data (proceeding data and result data) in the NAND-type flash memory 48, a game card or an SD card. The sound output program is a program for outputting a sound required for the game, such as sound effects, voices (onomatopoeic sounds), music (BGM), etc.

In the data memory area 504, data for generation of the own apparatus 504a, hash value data of the own apparatus 504b, data for generation of the other apparatus 504c, first hash value data of the other apparatus 504d, second hash value data of the other apparatus 504e, and communication allowance list data 504f are stored.

The data for generation of the own apparatus 504a is data for generation generated according to the data for generation generating program 502c in the game apparatus 10 of the own apparatus. The hash value data of the own apparatus 504b is hash value data calculated by using the data for generation of the own apparatus 504a according to the hash value data calculating program 502d in the game apparatus 10 of the own apparatus.

The data for generation of the other apparatus 504c is data for generation received from another game apparatus 10. That is, the data for generation of the other apparatus 504c is equivalent to the data for generation of the own apparatus generated in the other game apparatus 10. The first hash value data of the other apparatus 504d is hash value data received from another game apparatus 10. That is, the first hash value data of the other apparatus 504d is equivalent to the own apparatus hash value data calculated in the other game apparatus 10. The second hash value data of the other apparatus 504e is hash value data calculated by using the data for generation of the other apparatus 504c according to the hash value data calculating program 502d.

Here, although omitted in FIG. 10 for the sake of simplicity, the first hash value data of the other apparatus 504d (or, the second hash value data of the other apparatus 504e) is stored by the number subtracted by one from the total number of game apparatuses 10 playing the communication game.

Furthermore, although detailed description is omitted, the data for generation of the other apparatus 504c and the second hash value data of the other apparatus 504e (or the first hash value data of the other apparatus 504d) are deleted from the main memory 50 when the authentication processing is ended.

The communication allowance list data 504f is data about the list describing an MAC address as to the game apparatus 10 with which a communication is allowed. The parent game apparatus 10 decides participants in the communication game on the basis of the communication allowance list.

Although illustration is omitted, in the data memory area 504, other data required for execution of the game program is stored, and a counter (timer) and a flag are provided.

Figure 11:
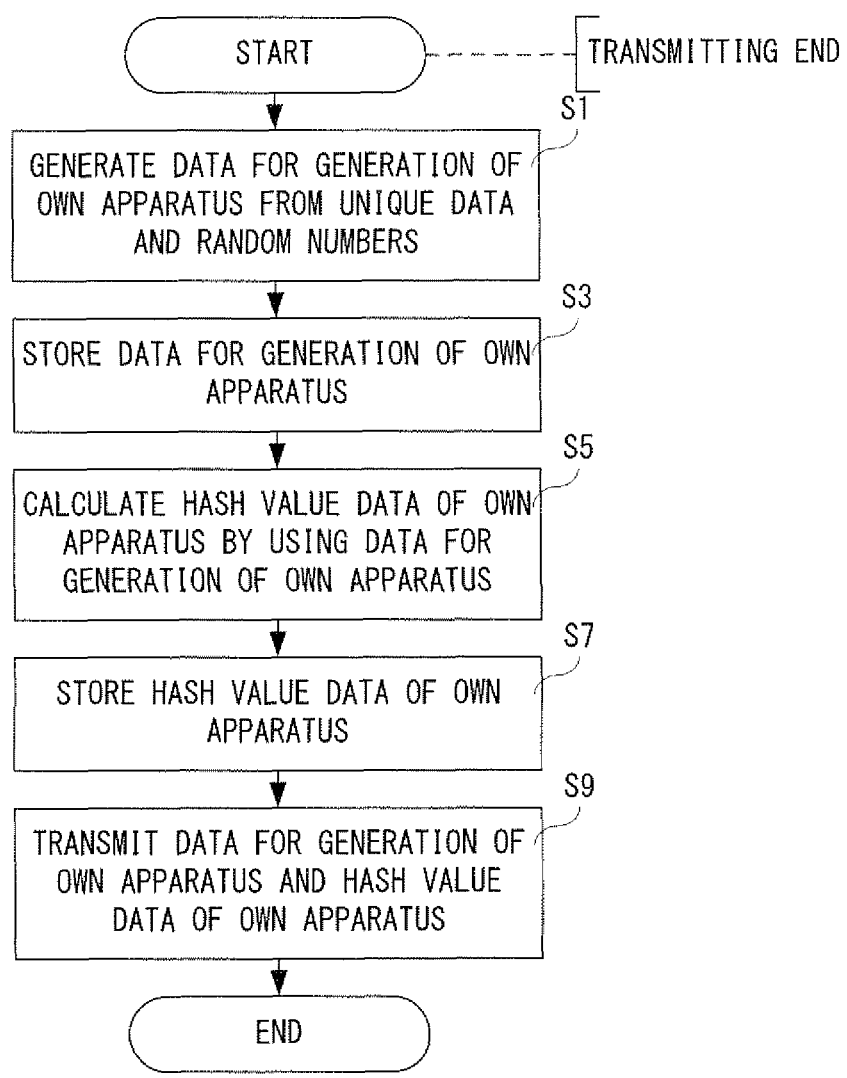
FIG. 11 is a flowchart showing authentication processing by a CPU of a game apparatus of a transmitting end.
Figure 12:
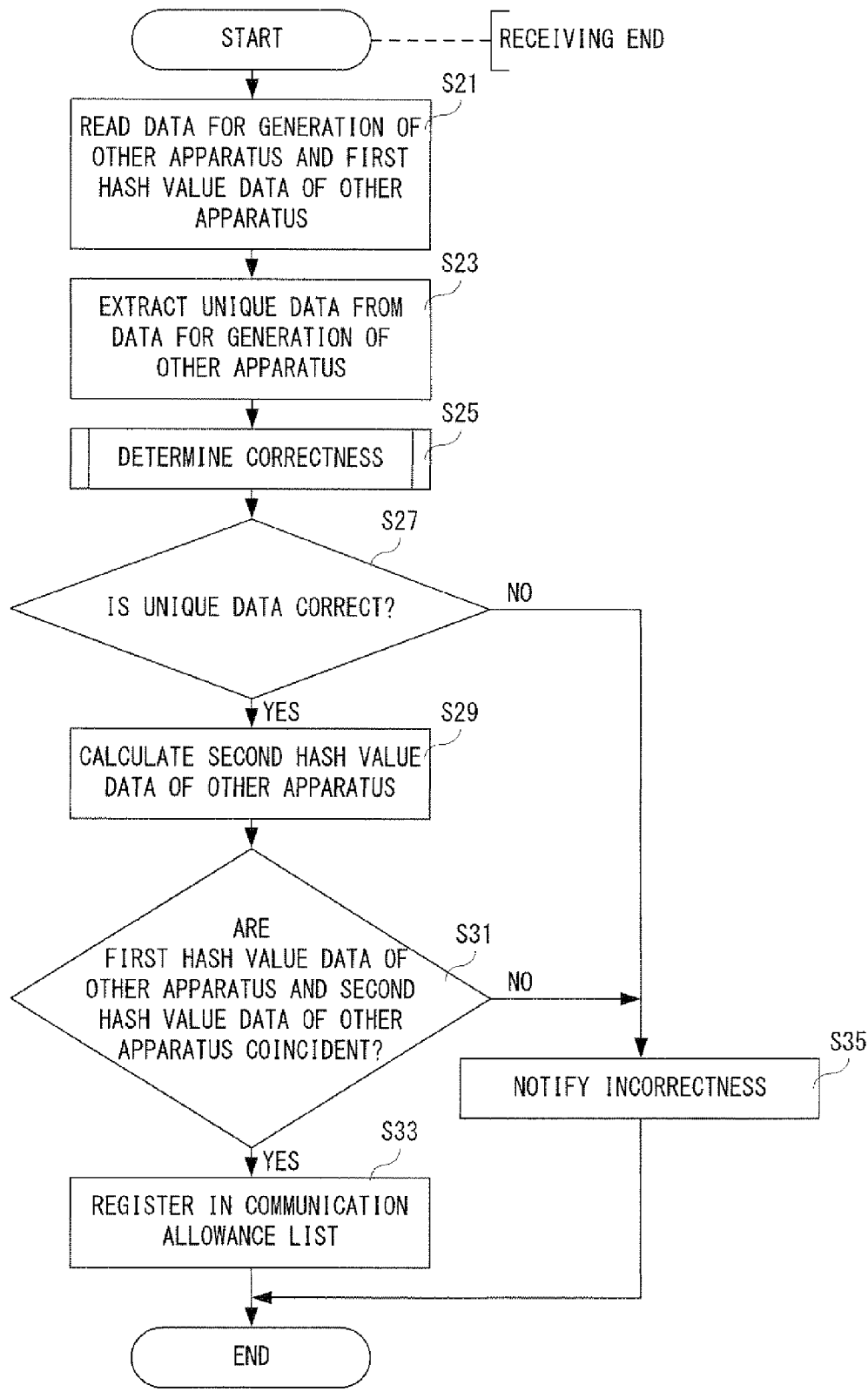
FIG. 12 is a flowchart showing authentication processing by a CPU of a game apparatus of a receiving end.

FIG. 11 and FIG. 12 are flowcharts showing authentication processing (on the transmitting end and the receiving end) to be executed prior to starting the main part of the communication game. FIG. 11 is the authentication processing as to the game apparatus 10 of the transmitting end (corresponding to the above-described game apparatus A), and FIG. 12 is the authentication processing as to the game apparatus 10 of the receiving end (corresponding to the above-described game apparatus B).

As shown in FIG. 11, when the CPU 44a of the game apparatus 10 of the transmitting end starts the authentication processing, it generates data for generation of the own apparatus 504a from unique data and random number data in a step S1. Here, at this time, the CPU 44a creates the unique data and generates the random number data. Then, the CPU 44a arranges the unique data and the random number data to the bit as described above to thereby generate data for generation of the own apparatus. Iia a next step S3, the data for generation of the own apparatus 504a generated in the step S1 is stored (saved) in the data memory area 504a.

Succeedingly, in a step S5, the calculation is performed with the hash function by utilizing the data for generation of the own apparatus 504a to thereby generate hash value data of the own apparatus 504b. In a next step S7, the hash value data of the own apparatus 504b generated in the step S5 is stored in the data memory area 504. Then, in a step S9, the data for generation of the own apparatus 504a and the hash value data of the own apparatus 504b are transmitted to the game apparatus 10 of the receiving end, and the processing is ended. Here, in the step S9, copies of the data for generation of the own apparatus 504a and the hash value data of the own apparatus 504b are transmitted (output) to devices outside thereof, such as other game apparatuses 10 (the game apparatus 10 of the receiving end, here).

On the other hand, as shown in FIG. 12, when the CPU 44a of the game apparatus 10 of the receiving end starts the authentication processing, it reads data for generation of the other apparatus 504c and first hash value data of the other apparatus 504d in a step S21. Here, the data for generation of the other apparatus 504c is equivalent to the data for generation of the own apparatus transmitted by the CPU 44a of the game apparatus 10 of the transmitting end as described above. The first hash value data of the other apparatus 504d is also equivalent to the hash value data of the own apparatus transmitted by the CPU 44a of the game apparatus 10 of the transmitting end as described above. That is, the data for generation of the other apparatus 504c and the first hash value data of the other apparatus 504d are input from devices outside the game apparatus 10, such as other game apparatuses 10 (the game apparatus 10 of the transmitting end, here).

In a succeeding step S23, unique data is extracted from the data for generation of the other apparatus 504c, and in a step S25, correctness determining processing (see FIG. 13) described later is executed. That is, in the step S25, the correctness of the unique data extracted in the step S23 is determined. Then, in a step 527, it is determined whether or not the unique data is correct.

If "NO" in the step S27, that is, if the unique data is incorrect, the process proceeds to a step S35. On the other hand, if "YES" in the step S27, that is, if the unique data is correct, second hash value data of the other apparatus 504e is calculated in a step S29. Here, the CPU 44a performs the calculation with the hash function by utilizing the data for generation of the other apparatus 504c to thereby calculate the second hash value data of the other apparatus 504e, and stores the same in the data memory area 504. Then, in a step S31, it is determined whether or not the first hash value data of the other apparatus 504d and the second hash value data of the other apparatus 504e are coincident with each other. That is, the correctness of the data for generation of the other apparatus 504c itself is determined.

If "YES" in the step S31, that is, if the first hash value data of the other apparatus 504d and the second hash value data of the other apparatus 504e are coincident with each other, the data for generation of the other apparatus 504c is determined to be correct and registered in the communication allowance list in a step S33, and the processing is ended. That is, in the step S33, the CPU 44a of the game apparatus 10 of the receiving end records (adds) the MAC address corresponding to the unique data included in the data for generation of the other apparatus 504c in the communication allowance list. On the other hand, if "NO" in the step S31, that is, if the first hash value data of the other apparatus 504d and the second hash value data of the other apparatus 504e are not coincident with each other, it is determined that the data for generation of the other apparatus 504c is incorrect, incorrectness is notified in the step S35, and the processing is ended. That is, in the step S35, the CPU 44a of the game apparatus 10 of the receiving end displays a message that it is impossible to make a communication game with the game apparatus 10 of the transmitting end on the lower LCD 14 (stereoscopic LCD 12 may be possible), outputs a sound indicating thereof from the speakers 22a, 22b, or executes both of them as described above.

Figure 13:
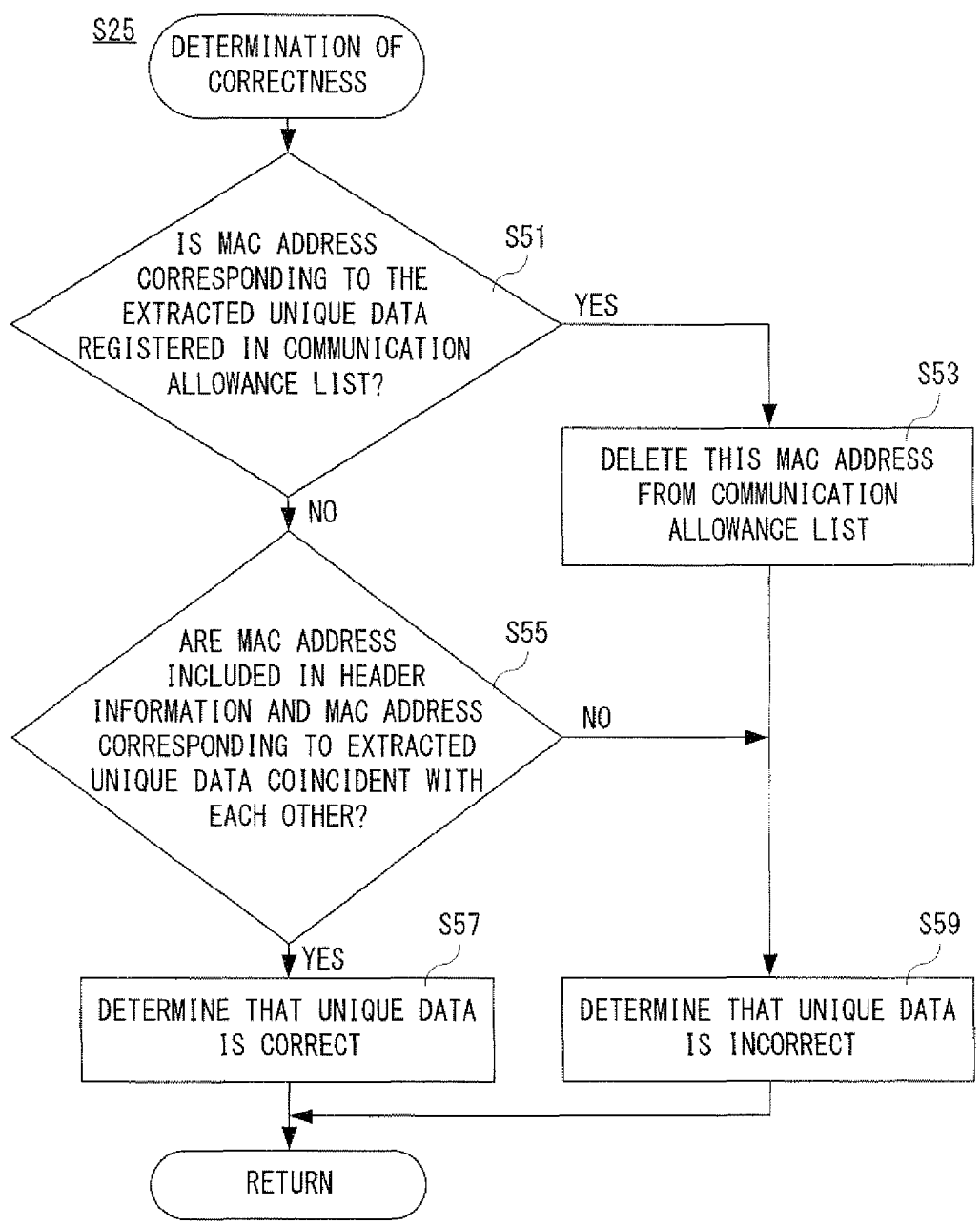
FIG. 13 is a flowchart showing correctness determining processing by the CPU of the game apparatus of the receiving end.

FIG. 13 is a flowchart showing the correctness determining processing shown in the step S25 in FIG. 12. As shown in FIG. 13, when the CPU 44a of the game apparatus 10 of the receiving end starts the correctness determining processing, it determines whether or not the MAC address corresponding to the unique data extracted from the data for generation of the other apparatus 504c is registered in the communication allowance list in a step S51.

If "YES" in the step S51, that is, if the MAC address corresponding to the extracted unique data is registered in the communication allowance list, the MAC address the same as this MAC address is deleted from the communication allowance list in a step S53, and the process proceeds to a step S59.

On the other hand, if "NO" in the step S51, that is, if the MAC address corresponding to the extracted unique data is not registered in the communication allowance list, the MAC address included in the header information and the extracted MAC address corresponding to the unique data are coincident with each other in a step S55.

If "YES" in the step S55, that is, if the two MAC addresses are coincident, it is determined that the extracted unique data is correct in a step S57, and the process returns to the authentication processing of the receiving end shown in FIG. 12. On the other hand, if "NO" in the step S55, that is, if the two MAC addresses are not coincident with each other, it is determined that the extracted unique data is incorrect in the step S59, and the process returns to the authentication processing of the receiving end shown in FIG. 12.

According to this embodiment, the correctness of each of the unique data and the data for generation is determined, the hash value calculated with the one-way function by using the correct data for generation is used as a parameter, or the parameter calculated based on the hash value is used, and therefore, it is possible to prevent the communication game by using the falsified game data from being played. Thus, it is possible to prevent falsification itself of the game data.

Here, in this embodiment, the correctness as to both of the unique data and the data for generation is determined, but if the correctness of at least the data for generation is determined, it is possible to prevent the communication game by using the falsified game data from being played.

Furthermore, in this embodiment, the MAC address is utilized as apparatus-specific information, but there is no need of being restricted thereto. As other examples, current time (including year, month, and date) information, a name registered in the game apparatus, a signature of the game program, such as a title of the virtual game, a serial number of software, etc., a login ID to the server (ID of the communication game), a sign (a set of coordinates or trajectory) input with the touch pen, a history of operation inputs, a history of acceleration data detected by the acceleration sensor provided to the game apparatus, information obtained from the camera (brightness information obtained from the image data, for example), information about a character created by a player in a game apparatus (information about gender, color of skin, hairstyle, a shape, and a size and a position of eyes, eyebrows, nose and a mouth, body height, figure, etc.) may be utilized. Furthermore, in a case that the game apparatus has a GPS function, the position information can be used as apparatus-specific information.

In a case that the contents included in the header information, such as an ID in the communication game, identification information (game title) of the virtual game or information about the current time (including year, month, date) are used as apparatus-specific information, processing similar to the correctness determining processing shown in FIG. 13 is executed. Here, in a case that the identification information of the virtual game is used as apparatus-specific information, it is determined whether or not the virtual game indicated by the identification information of the virtual game is to be executed by the CPU of the game apparatus of the receiving end in a step S55. In this case, if it is the virtual game to be executed by the CPU of the game apparatus of the receiving end, "YES" is determined, and if it is the virtual game not to be executed by the CPU of the game apparatus of the receiving end, "NO" is determined.

On the other hand, in a case that contents that are not included in the header information, such as a history of operation inputs, and a history of acceleration data are used as apparatus-specific information, the correctness determining processing is executed only depending on whether or not to be stored in the communication allowance list. In such a case, the processing in the step S55 is deleted.

Furthermore, in this embodiment, only the MAC address is used as apparatus-specific information, but any two or more of the MAC addresses and the other examples described above may be utilized.

In addition, in this embodiment, only a case that the authentication processing is executed between the game apparatuses is explained, but there is no need of being restricted thereto. For example, in the game system shown in FIG. 7(B), the server receives the data for generation and the hash value data from each of the game apparatuses, executes the authentication processing of the receiving end shown in FIG. 12 to determine a correctness as to them, and makes matching between the game apparatuses which transmit the data for generation and the hash value data about which it is determined to be correct.

Furthermore, in this embodiment, the data for generation and the hash value data are transmitted and received by a wireless communication, but there is no need of being restricted thereto. Communications may be made by a wired communication. Alternatively, the data for generation and the hash value data are stored as save data in a game card or a SD card without making communications, and the data for generation and the hash value data may be exchanged via such the game card or the SD card. In such a case, the game card or the SD card are attached to a computer (the game apparatus in the above-described embodiment may be possible) prepared by a host, or the like of an event in an event site, and from the game card or the SD card, the data for generation and the hash value data are input. Successively, by executing the authentication processing of the receiving end by the computer shown in FIG. 12, the correctness of the data for generation and the hash value data stored in the game card or the SD card may be determined. Then, depending on the determination result of the correctness, whether participation in the event is possible or not is decided.

In addition, in this embodiment, a description is only made on the portable-type game apparatus, but a console-type game apparatus having a communication function can be utilized. This invention can also be applied to Nintendo Wii (registered trademark) manufactured and sold by the applicants, for example. In such a case, as apparatus-specific information (unique data), a history of acceleration data or angular velocity data that are detected by the controller or a history of the positions (coordinates) designated by the controller can be utilized.

In addition, in this embodiment, as one example of the information processing apparatus, only the game apparatus is described, but other information processing apparatuses (PC, PDA, cellular phone, TV, electronic photo frame, music/video player, various information home-appliances, etc. other than the game apparatus) can be used if they can exchange the data for generation and the hash value data by having a communication function or being detachable with a medium like an SD card. Here, in a case that other information processing apparatuses except for the game apparatus are used, the hash value (parameter) need not be varied. In such a case, without using a value varying at random like random numbers, only with the apparatus-specific information (unique data), the data for generation may be generated.

Moreover, there is no need of being restricted to the configuration of the game apparatus shown in this embodiment. For example, one LCD may be appropriate, and no touch panel may be provided. Furthermore, the touch panel may be provided on the two LCDs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an information processing program to be executed by a computer of an information processing apparatus performing processing based on taken data, said information processing program configured to cause the computer to function as:

a processing data calculator which calculates processing data from predetermined data by using a predetermined one-way function;

an outputter which outputs said predetermined data and said processing data calculated by said processing data calculator to outside;

an inputter which inputs predetermined data and processing data from outside;

a verification data calculator which calculates verification data from said predetermined data input by said inputter by using said predetermined one-way function; and an executor which executes predetermined processing by using said processing data when said processing data input by said inputter and said verification data calculated by said verification data calculator are coincident with each other.

2. A non-transitory storage medium according to claim 1, wherein
said information processing program causes said computer to further function as:
a predetermined data generator which generates said predetermined data including determinable data capable of determining correctness, and
a correctness determiner which determines correctness of the determinable data included in said predetermined data input by said inputter, wherein
said verification data calculator calculates said verification data when said correctness determiner determines to be correct.

3. A non-transitory storage medium according to claim 1, wherein
said executor executes predetermined processing by using said processing data as a parameter.

4. A non-transitory storage medium according to claim 2, wherein
said determinable data is information specific to said information processing apparatus.

5. A non-transitory storage medium according to claim 4, wherein
said correctness determiner determines to be correct if the information specific to the information processing apparatus included in the predetermined data input by said inputter is information specific to the information processing apparatus being a source of outputs of the predetermined data and the processing data that are input by said inputter.

6. A non-transitory storage medium according to claim 4, wherein
said information specific to the information processing apparatus includes an MAC address of said information processing apparatus.

7. A non-transitory storage medium according to claim 4, wherein
said information specific to the information processing apparatus includes date and time information when said predetermined data is generated.

8. A non-transitory storage medium according to claim 7, wherein
said correctness determiner determines to be correct if the date and time information included in the predetermined data input by the inputter does not exist date, and time information being coincident with the date and time information included in the predetermined data that was input by the inputter before.

9. A non-transitory storage medium according to claim 4, wherein
said information specific to the information processing apparatus includes processing-specific information capable of recognizing processing to be executed by said executor.

10. A non-transitory storage medium according to claim 9, wherein
said correctness determiner further determines to be correct if the processing-specific information included in the predetermined data input by said inputter represents the processing to be executed by said executor.

11. A non-transitory storage medium according to claim 4, wherein
said predetermined data further includes values varying at random.

12. A non-transitory storage medium according to claim 1, wherein
said predetermined one-way function is a hash function.

13. A non-transitory storage medium according to claim 1, wherein
said information processing apparatus is connected to a network,
said outputter includes a transmitter transmitting said predetermined data and said processing data to other information processing apparatuses on said network, and
said inputter includes a receiver receiving said predetermined data and said processing data from other information processing apparatuses on said network.

14. An information processing apparatus comprising:
a processing system that includes at least one hardware processor coupled to a memory, the processing system configured to calculate first processing data from first predetermined data by using a one-way function;
a transceiver configured to:
transmit the calculated first processing data and the first predetermined data to a receiving computing device, and
receive second processing data and second predetermined data from a transmitting computing device different from the information processing apparatus,
the processing system configured to:
calculate verification data from the received second predetermined data by using the one-way function;
compare the calculated verification data to the second processing data; and
as a result of the calculated verification data and the second processing data being coincident with each other, use the second processing data in a computer process.

15. An information processing method of an information processing apparatus performing processing based on taken data, the method comprising:
(a) calculating processing data from predetermined data by using a predetermined one-way function;
(b) outputting said predetermined data and said processing data calculated by said step (a) to outside;
(c) inputting predetermined data and processing data from outside;
(d) calculating verification data from said predetermined data input by said step (c) by using said predetermined one-way function; and
(e) executing predetermined processing by using said processing data when said processing data input by said step (c) and said verification data calculated by said step (d) are coincident with each other.

16. An information processing system comprising:
a first information processing apparatus comprising:
a processing system that includes at least one hardware processor, the processing system configured to calculate a first hash of first data by using a hash function; and
a transceiver configured to transmit the first data and the first hash; and
a second information processing apparatus comprising:
a transceiver configured to receive the first data and the first hash; and
a processing system that includes at least on hardware processor, the processing system configured to:
calculate a verification hash of the received first data by sin the hash function;

compare the calculated verification hash to the first hash; and use the calculated verification hash or the first hash in a computer process as a result of determining the calculated verification hash and the first hash as usual to each other.

17. A non-transitory storage medium storing a game program to be executed by a computer of a game apparatus performing processing based on taken data, said game program configured to cause said computer to function as:

a processing data calculator which calculates processing data from predetermined data including values varying at random by using a predetermined one-way function;

an outputter which outputs said predetermined data and said processing data calculated by said processing data calculator to outside;

an inputter which inputs predetermined data including values varying at random and processing data from outside;

a verification data calculator which calculate verification data from said predetermined data input by said inputter by using said predetermined one-way function; and a game executor which execute game processing by using said processing data when said processing data input by said inputter and said verification data calculated by said verification data calculator are coincident with each other.

18. A game apparatus comprising:

a processing system that includes at least one hardware processor coupled to a memory, the processing system configured to calculate, by using a one-way function, first processing data from first game data, which includes values that vary at random, of a game application program;

a transceiver configured to:
transmit the calculated first processing data and the first game data to a receiving computing device, and
receive second processing data and second game data from a transmitting computing device different from the information processing apparatus, the processing system configured to:
calculate verification data from the received second game data by using the one-way function;
compare the calculated verification data to the second processing data; and
as a result of the calculated verification data and the second processing data being coincident with each other, use the second processing data or the calculated verification data in the game application program.

19. A game controlling method of a game apparatus performing processing based on taken data, the method comprising:

(a) calculating processing data from predetermined data including values varying at random by using a predetermined one-way function;

(b) outputting said predetermined data and said processing data calculated by said step (a) to outside;

(c) inputting predetermined data including values varying at random and processing data from outside;

(d) calculating verification data from said predetermined data input by said step (c) by using said predetermined one-way function; and (e) executing game processing by using said processing data when said processing data input by said step (c) and said verification data calculated by said step (d) are coincident with each other.

20. A game system comprising:

at least two game apparatuses performing processing based on taken data, wherein each of said game apparatuses comprises:

a processing data calculator which calculates processing data from predetermined data including values varying at random by using a predetermined one-way function;

an outputter which outputs said predetermined data and said processing data calculated by said processing data calculator to outside;

an inputter which inputs predetermined data including values varying at random and processing data from outside;

a verification data calculator which calculate verification data from said predetermined data input by said inputter by using said predetermined one-way function; and a game executor which execute game processing by using said processing data when said processing data input by said inputter and said verification data calculated by said verification data calculator are coincident with each other.

* * * * *